March 12, 1963

T. E. LOHR 3,081,078

DECK LID LATCH AND ACTUATOR

Filed May 28, 1959

INVENTOR.
Thomas E. Lohr
BY
Herbert Furman
ATTORNEY

March 12, 1963

T. E. LOHR 3,081,078

DECK LID LATCH AND ACTUATOR

Filed May 28, 1959

INVENTOR.
Thomas E. Lohr
BY
Herbert Furman
ATTORNEY

March 12, 1963  T. E. LOHR  3,081,078
DECK LID LATCH AND ACTUATOR
Filed May 28, 1959  9 Sheets-Sheet 3

INVENTOR.
Thomas E. Lohr
BY
Herbert Furman
ATTORNEY

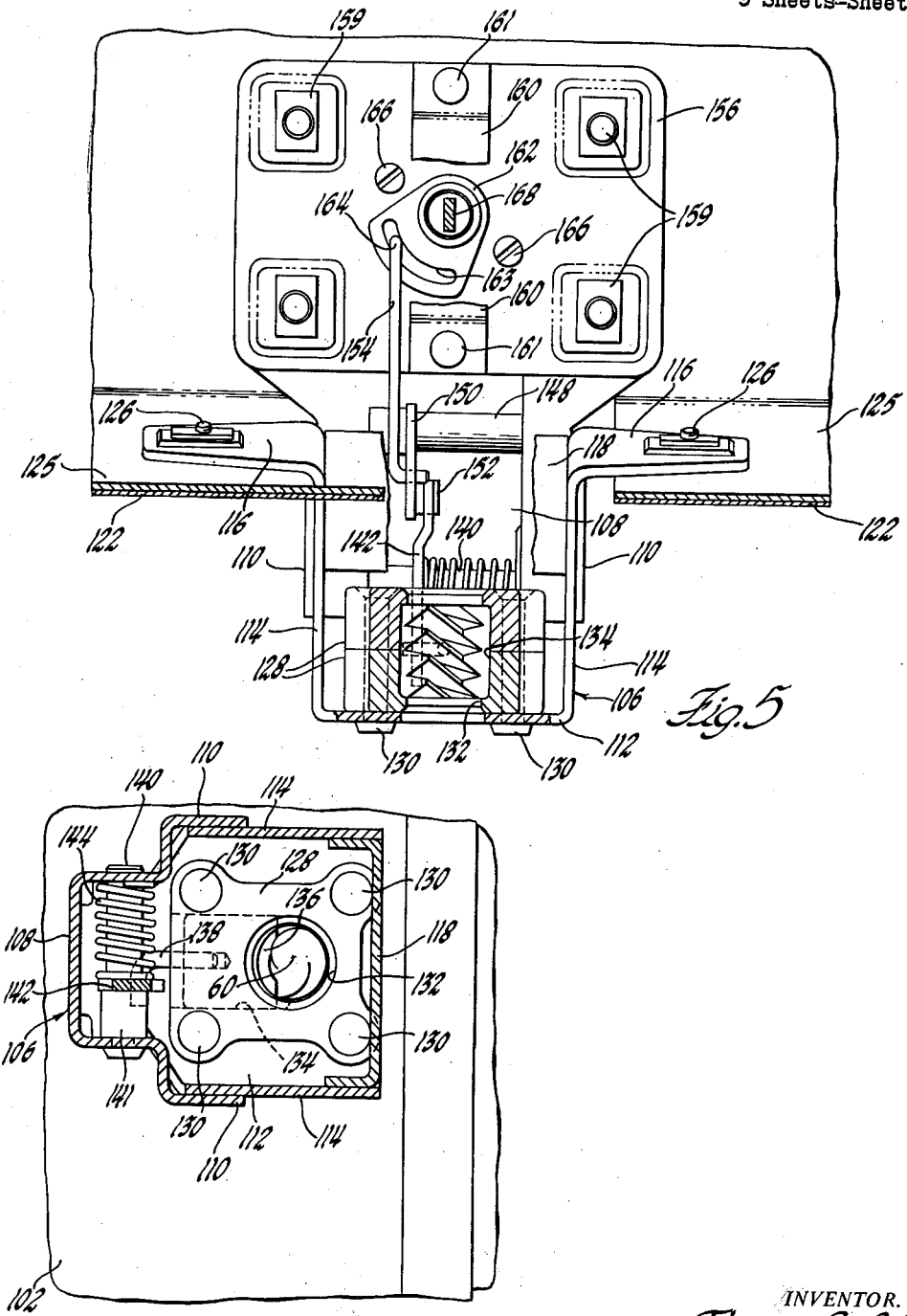

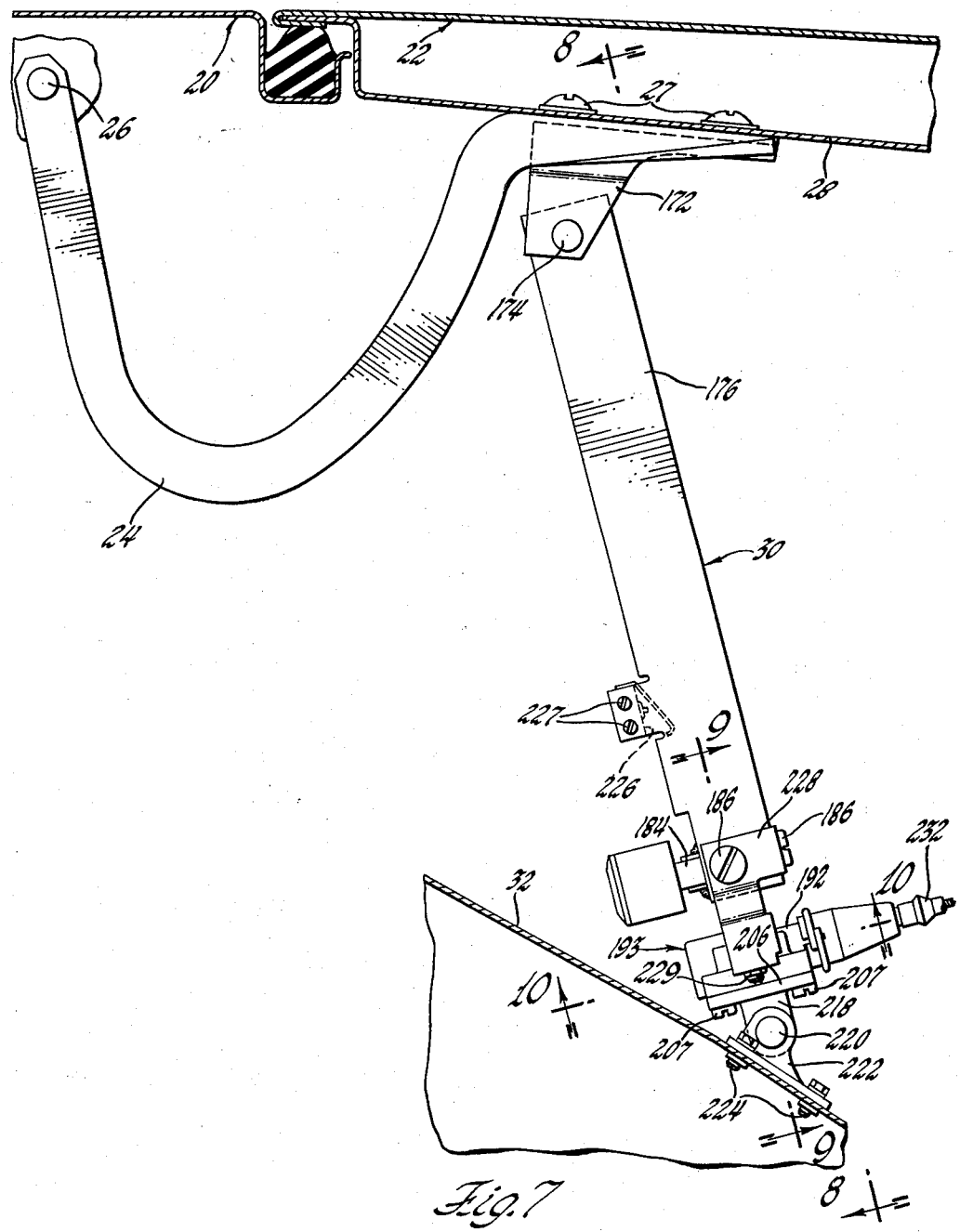

March 12, 1963 T. E. LOHR 3,081,078
DECK LID LATCH AND ACTUATOR
Filed May 28, 1959 9 Sheets-Sheet 6
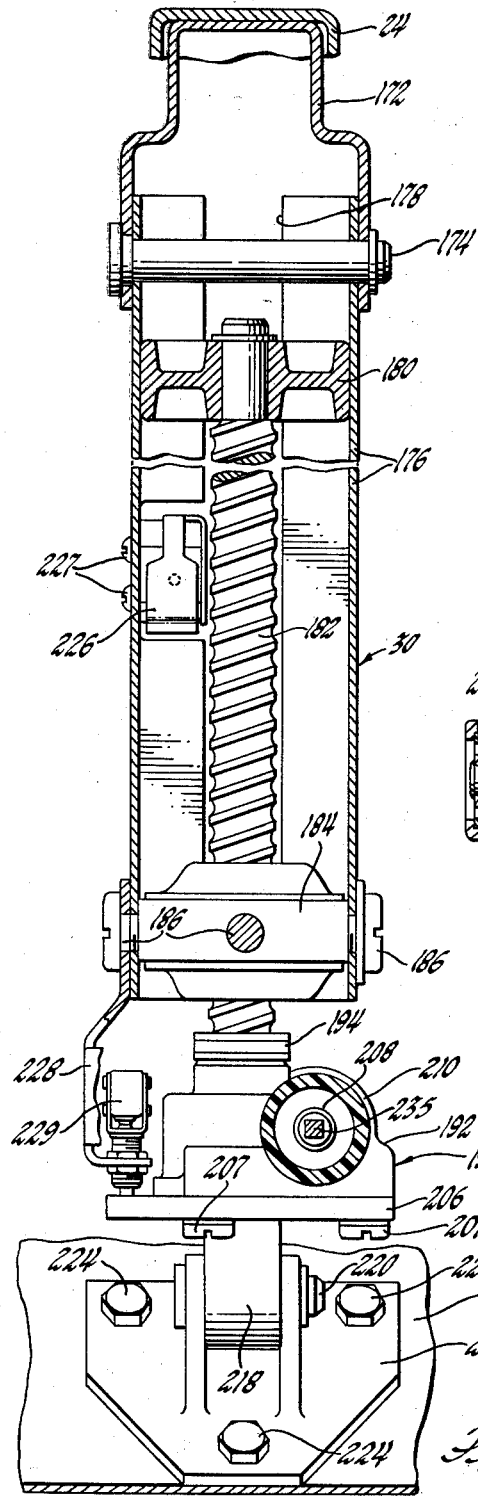
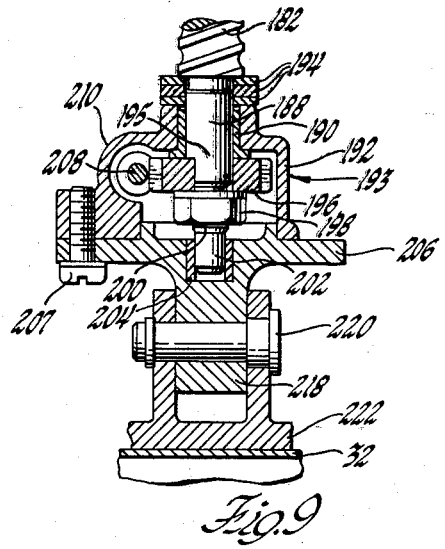
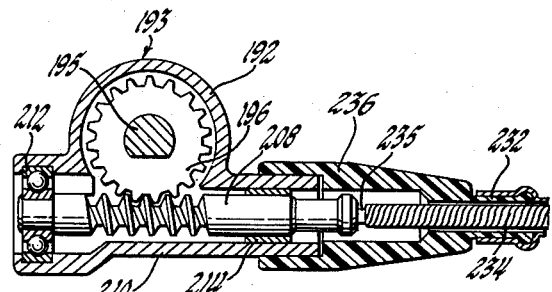
INVENTOR.
Thomas E. Lohr
BY
Herbert Furman
ATTORNEY March 12, 1963 T. E. LOHR 3,081,078
DECK LID LATCH AND ACTUATOR
Filed May 28, 1959 9 Sheets-Sheet 7

INVENTOR.
Thomas E. Lohr
BY
Herbert Furman
ATTORNEY

March 12, 1963 T. E. LOHR 3,081,078
DECK LID LATCH AND ACTUATOR
Filed May 28, 1959 9 Sheets-Sheet 8

INVENTOR.
Thomas E. Lohr
BY
Herbert Furman
ATTORNEY

March 12, 1963     T. E. LOHR     3,081,078
DECK LID LATCH AND ACTUATOR
Filed May 28, 1959     9 Sheets-Sheet 9

INVENTOR.
Thomas E. Lohr
BY
Herbert Furman
ATTORNEY

United States Patent Office 3,081,078
Patented Mar. 12, 1963

3,081,078
DECK LID LATCH AND ACTUATOR
Thomas E. Lohr, Detroit, Mich., assignor to General Motors Corporation, Detroit, Mich., a corporation of Delaware
Filed May 28, 1959, Ser. No. 816,458
2 Claims. (Cl. 268—74)

This invention relates to vehicle closure actuators and latches and more particularly to a vehicle closure actuator and latch arrangement which is both manually and power operable for moving a vehicle closure between a closed latched position and an open unlatched position.

The actuator and latch arrangement of this invention is particularly intended for use with vehicle deck lids which open and close vehicle rear deck compartments. The actuator is of the power operated screw and nut type and is operative to move the deck lid between partially open and fully open positions when the deck lid is unlatched from the body. The nut of the actuator is of the selective free wheeling type whereby the deck lid may be manually moved between these positions whenever desired or in the event of a power failure or other condition preventing power operation of the actuator.

The closure latch of this invention is generally of the screw and nut type and includes a power operated lead screw which is threadable into and out of an improved nut assembly to thereby move the deck lid between partially open and fully closed positions. The nut assembly generally comprises a housing having a bore therein for freely receiving the lead screw and a threaded nut member which is movably laterally relative to the lead screw into and out of threaded engagement with a circumferential portion of the threads thereof. Since only a circumferential portion of the threads of the screw are engaged by the nut member, the screw can be easily threaded out of engagement therewith, and likewise, the nut member may easily be manually moved out of engagement with the lead screw to thereby quickly release the nut member and lead screw whenever the deck lid is opened.

The actuator and latch are power operated by a single reversible electric motor and are interconnected by a control circuit for coordinating operation thereof whereby the deck lid may be controlled from either the interior of the body or the exterior thereof and further may be manually moved between its open and closed positions from the exterior of the body.

The primary object of this invention is to provide an improved closure actuator and latch arrangement which may be selectively and alternately power operated or manually operated to move a vehicle closure between a closed latched position and an open unlatched position. Another object of this invention is to provide an improved power operated vehicle closure and latch arrangement and control means therefor for moving a vehicle closure between a closed latched position and an open unlatched position. A further object of this invention is to provide an improved closure latch which includes a lead screw and a nut member movable laterally into and out of engagement with a circumferential portion of the threads of the lead screw.

These and other objects of this invention will be readily apparent from the following specification and drawings, wherein:

FIGURE 5 is an enlarged view taken generally along the plane indicated by line 5—5 of FIGURE 3;

FIGURE 6 is an enlarged sectional view taken generally along the plane indicated by line 6—6 of FIGURE 3;

FIGURE 7 is an enlarged view of a portion of FIGURE 1;

FIGURE 8 is an enlarged view, partially in section, taken generally along the plane indicated by line 8—8 of FIGURE 7;

FIGURE 9 is an enlarged sectional view taken along the plane indicated by line 9—9 of FIGURE 7;

FIGURE 10 is an enlarged sectional view taken generally along the plane indicated by line 10—10 of FIGURE 7;

Figure 1:
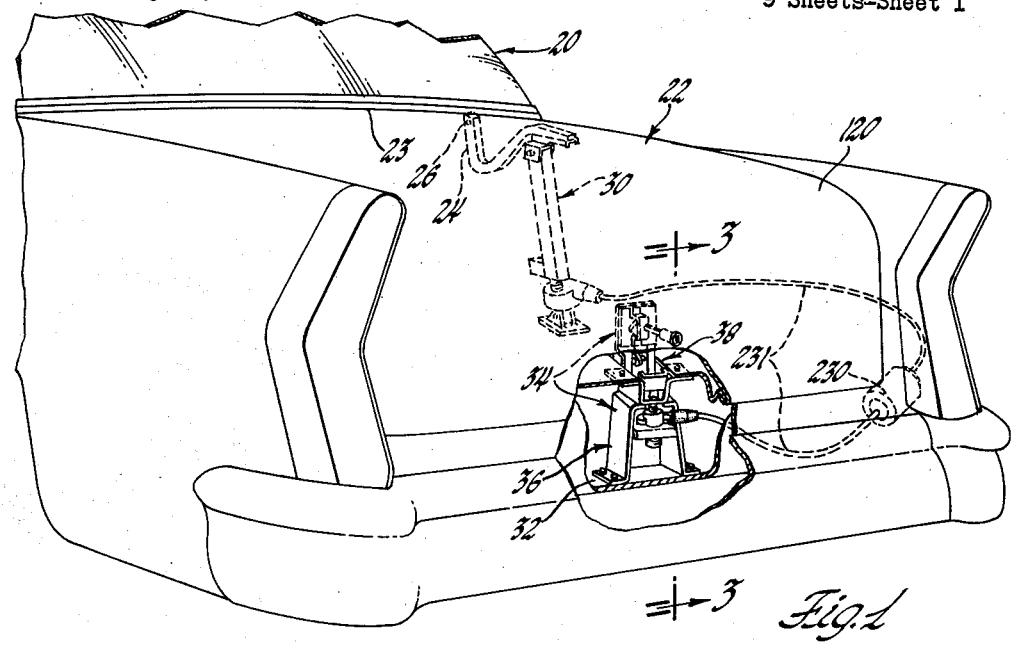
FIGURE 1 is a partial rear perspective view of a vehicle body embodying an actuator and latch arrangement according to this invention, with parts thereof broken away for clarity of illustration.

Referring now particularly to FIGURE 1 of the drawings, a vehicle body 20 includes a rear deck lid 22 which is swingably mounted on the body at its forward edge 23 by a pair of suitably counterbalanced hinge members 24, only one being shown, for movement of the deck lid between a closed latched position as shown and an open unlatched position, not shown. As shown in FIGURE 7 of the drawings, the hinge members 24 are pivoted to the body at 26 and are bolted at 27 to the deck lid inner panel 28 so as to swingably support the deck lid on the body. An actuator 30, which will be more fully described hereinafter, is interconnected between the deck compartment floor 32 and one of the hinge members 24 so as to move the deck lid between partially open and fully open positions. A closure latch 34 generally includes a power operated lead screw assembly 36 mounted on the body and a nut assembly 38 mounted on the deck lid 22 and threadedly cooperating with the lead screw assembly to latch the deck lid in the closed position thereof and to move the deck lid between a closed latched and a partially open position as will be more fully described hereinafter.

Figure 3:
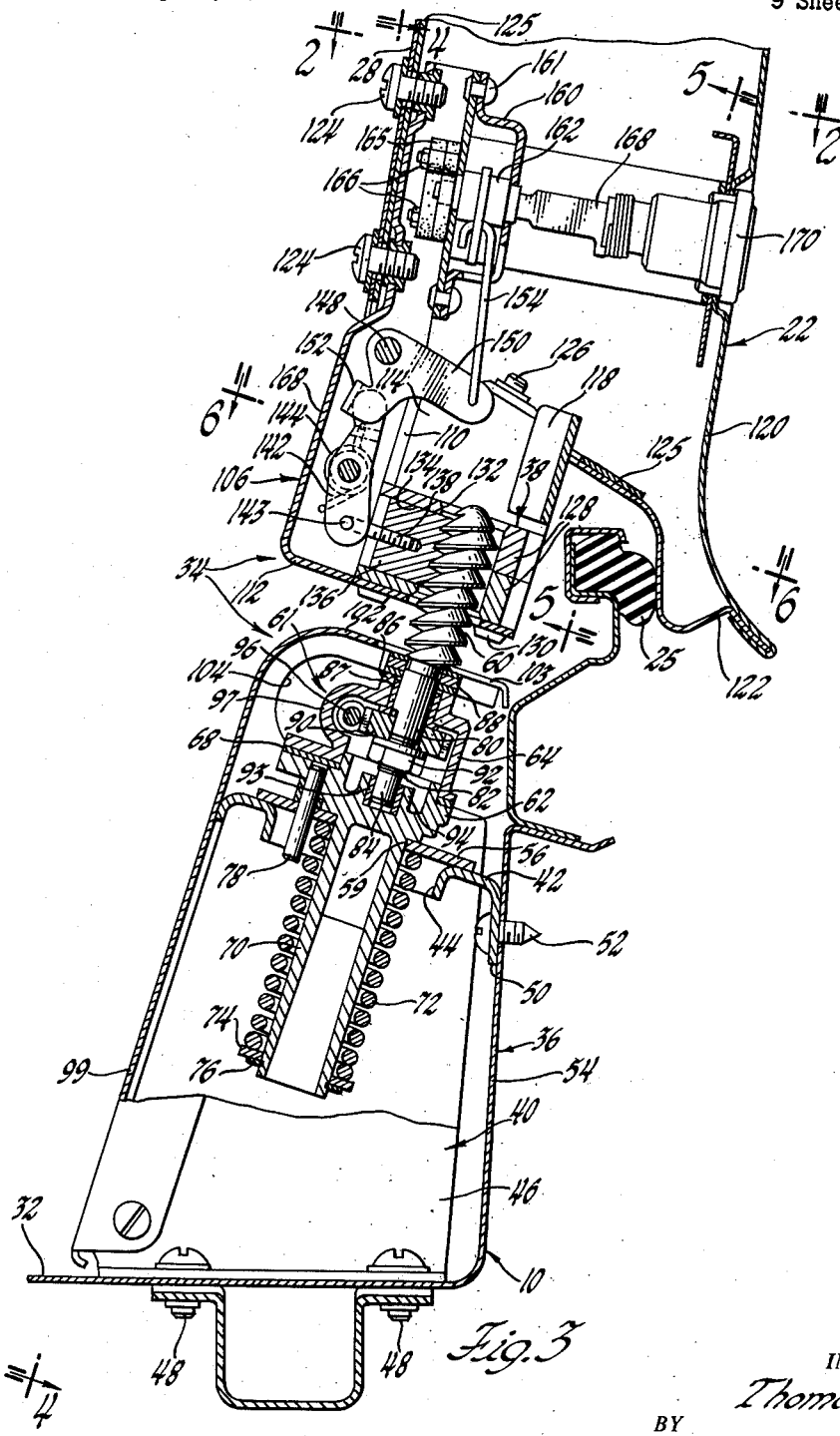
FIGURE 3 is an enlarged view, partially in section, taken generally along the plane indicated by line 3—3 of FIGURE 1.
Figure 4:
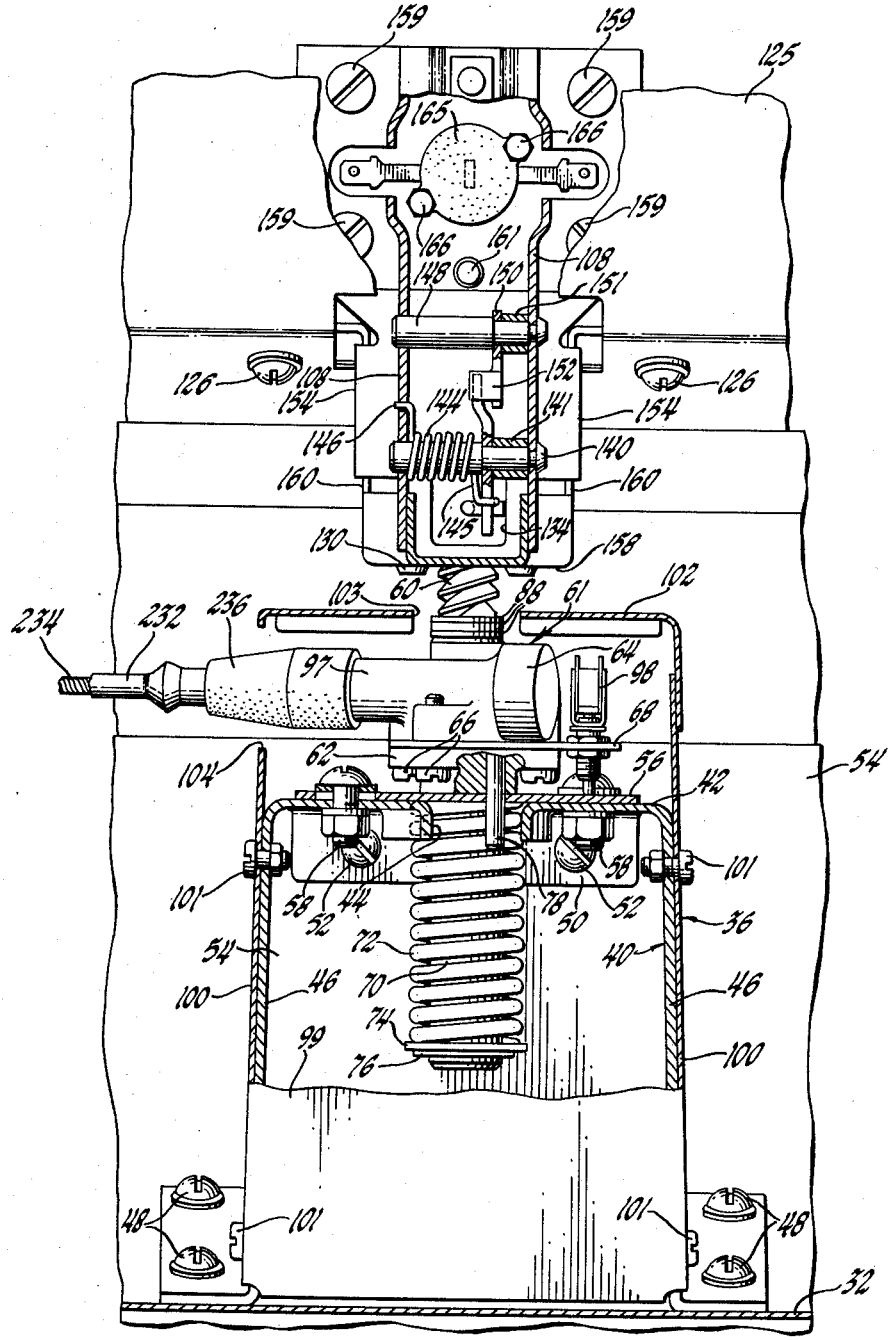
FIGURE 4 is a view taken generally along the plane indicated by line 4—4 of FIGURE 3, with parts thereof broken away for clarity of illustration.
Figure 11:
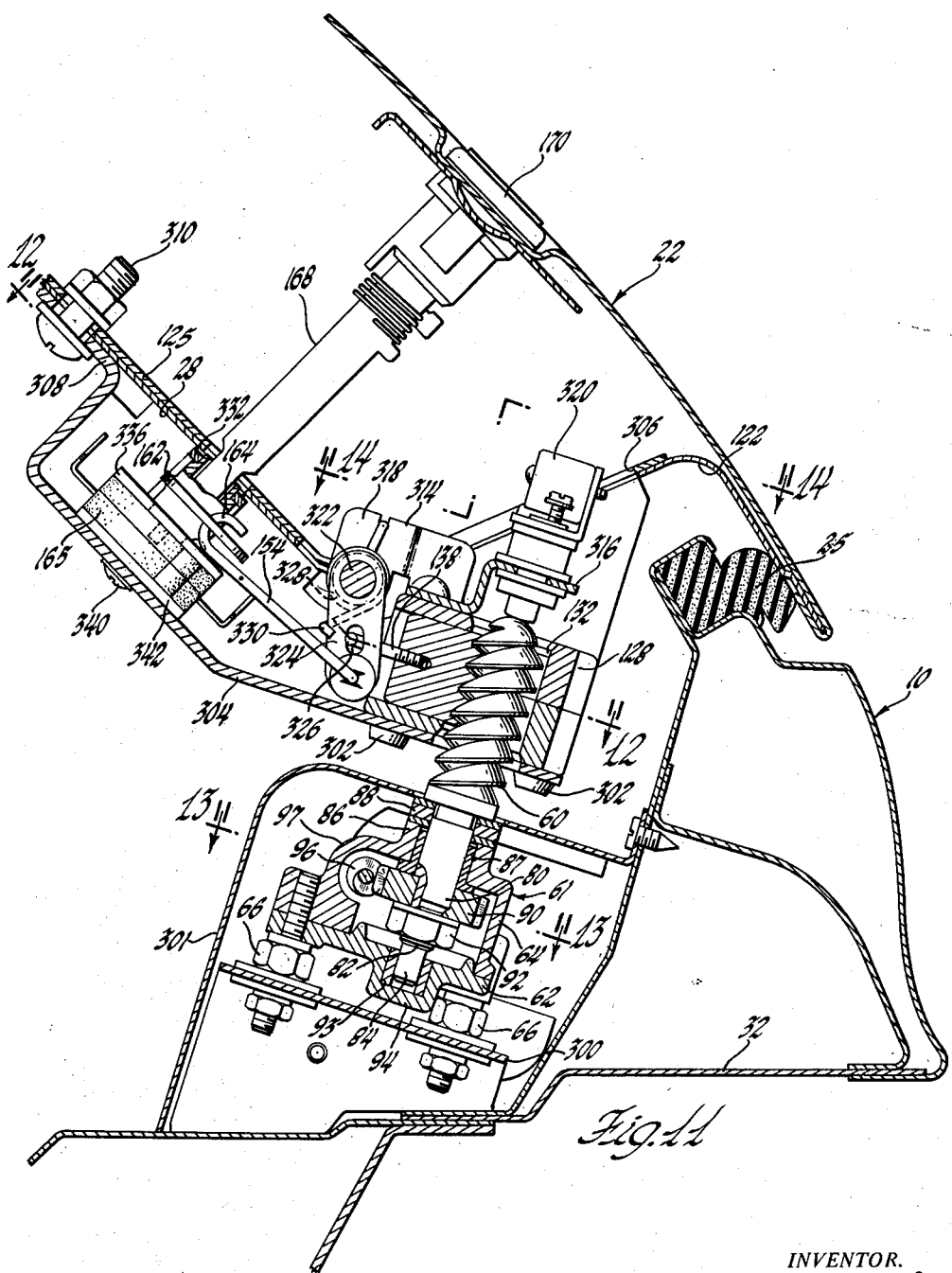
FIGURE 11 is a side elevational view, partially in section, of a modified latch.
Figure 12:
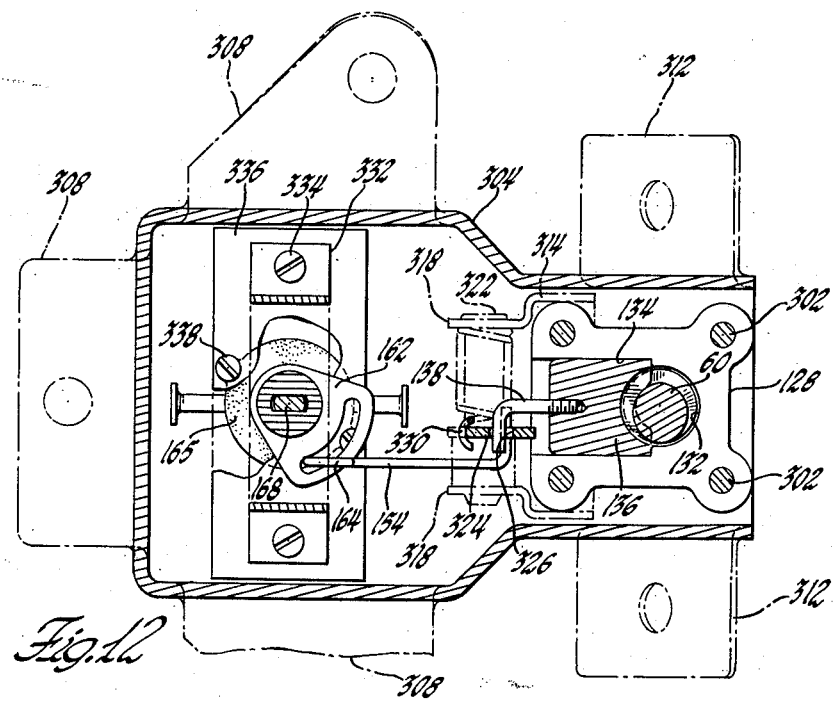
FIGURE 12 is an enlarged view, partially in section, taken along the plane indicated generally by line 12—12 of FIGURE 11.

Referring now particularly to FIGURES 3 and 4 of the drawings, the power operated lead screw assembly 36 will be described. A generally U-shaped support bracket 40 includes an upper plate portion 42 provided with a flanged aperture 44 and a pair of depending flanged legs 46, bolted at 48 to the floor 32 of the deck compartment. Plate 42 further includes a laterally extending flange 50 bolted at 52 to the rear wall 54 of the deck compartment. An apertured plate 56 is adjustably bolted to plate 42 at 58, and the aperture 59 thereof is of smaller diameter than the aperture 44 and opens thereto, as best shown in FIGURE 3 of the drawings.

A lead screw member 60 provided with a buttress type thread is rotatably supported by a gear reduction unit 61 mounted on plate 56 for tilting movement relative thereto, as will now be described. The gear reduction unit includes lower and upper housings 62 and 64, respectively, bolted together at 66 with a switch mounting plate 68 fitting between the housings and extending outwardly thereof for a purpose to be described. The lower housing 62 includes a depending tubular portion 70 of slightly smaller diameter than aperture 59 in plate 56. A coil compression spring 72 surrounds the tubular portion 70, with one end thereof seating on plate 56 and the other end thereof seating on a washer 74 which is retained on the tubular portion by a split ring 76 received within a groove in the tubular portion. A guide pin 78 is staked within the lower housing 62 and slidably fits within an aperture in plate 56 for a purpose to be hereinafter described.

As best shown in FIGURE 3, the shaft of lead screw member 60 includes a generally D-shaped portion 80, a threaded portion 82 of smaller diameter than portion 80, and a terminal shaft portion 84 of smaller diameter than either portions 80 or 82. The upper housing 64 includes an apertured boss 86 which mounts a flanged bushing 87 for the shaft of the lead screw member with a plurality of washers 88 being provided between the boss and the buttress threaded portion of the lead screw member. A worm wheel 90 having a central opening of generally D-shape is slidably and non-rotatably received on the D-shaped portion 80 of the shaft of the lead screw member and is held in engagement with the flange of bushing 87 by a nut 92 threaded on threaded portion 82. The shaft portion 84 is received within a bushing 93 mounted within a boss 94 of the lower housing 62 so as to locate and rotatably support the lower end of the lead screw member 60. A worm 96 is rotatably mounted within a boss 97 of the upper housing 64 and meshes with the worm wheel 90. As best shown in FIGURE 4 of the drawings, a normally closed limit switch 98 is secured in a suitable manner to plate 68 and the plunger of the switch engages the upper surface of the plate 56.

When the deck lid 22 is in a closed latched position as shown in FIGURE 3 wherein the lead screw member 60 is threaded within the nut assembly 38, the seal pressure caused by compression of the body weatherstrip 25 by deck lid 22 causes the lead screw member 60 and gear reduction unit 61 to be shifted slightly upwardly away from plate 56 against the action of spring 72 whereby switch 98 becomes opened. Switch 98 will remain open until the lead screw 60 has been threaded out of the nut assembly 38 a sufficient distance to allow weatherstrip 25 to return to an uncompressed condition whereupon spring 72 will shift the lead screw member 60 and gear reduction unit 61 slightly downwardly into engagement with plate 56 to again close switch 98.

In order to conceal and protect the assembly 36, a cover 99 bridges the space between the legs 46 of bracket 40 and includes flanges 100 bolted at 101 to the legs, and an upper plate portion 102 having slots 103 and 104 which receive the lead screw member 60 and boss 97, respectively, as best shown in FIGURE 4 of the drawings.

The operation of the lead screw assembly will be described hereinafter since it is believed that a better understanding of this operation can be had after the nut assembly 38 has been described.

Referring now particularly to FIGURES 2 through 6 of the drawings, the nut assembly 38 will be described. A support bracket generally designated as 106 includes a channel portion 108 provided with laterally extending bent flanges 110, and an apertured integral lower plate portion 112 provided with laterally upwardly extending bent flanges 114 spot welded to the flanges 110, with flanges 114 being further provided with laterally outwardly extending flanges 116. A generally U-shaped bracket 118 is spot welded to flanges 116, with the lower edge of the bracket being located above the lower plate portion 112 of bracket 106.

The deck lid 22 of the body includes an outer panel 120 joined to the inner panel 28 by a lower wall 122 is integral with the inner panel. The lower wall 122 and a portion of the inner panel 28 are apertured to receive the support bracket 106, with portion 108 of the bracket being bolted at 124 to the inner panel 32 and a reinforcing angle bracket 125 and the flanges 116 of the bracket being bolted at 126 to the lower wall 122 of the deck lid and to bracket 125. A pair of apertured guide blocks 128 are riveted together and to the lower plate portion 112 of bracket 106 at 130. The bore 132 of the guide blocks is aligned with the opening in the plate portion 112 of the bracket 106. As best shown in FIGURES 3, 5 and 6 of the drawings, the guide blocks are provided with square-shaped slots which face each other to define a generally square-shaped guide passage 134 opening to the bore 132 of the blocks. A nut member 136 is slidably mounted within guide passage 134, and one face of the nut member is provided with sections of buttress type threads which threadedly engage a circumferential portion of the buttress threads of the lead screw member 60 when this member is received within bore 132, as will be described. An angular pin 138 is staked to the nut member 136 and extends outwardly thereof, as best seen in FIGURES 3 and 6 of the drawings. A shouldered shaft 140 is staked to the opposite side walls of the channel portion 108 of bracket 106 and a lever 142 is rotatably mounted on the shaft, and located thereon by a bushing 141. The lower end of the lever is pivotally secured at 143 to the pin 138 whereby swinging movement of the lever relative to the shaft controls sliding movement of the nut member 136 within guide passage 134. A coil torsion spring 144 surrounds a portion of the shaft 140, with one end 145 of the spring being hooked over lever 142 and the other end 146 of the spring is hooked within an aperture in one of the side walls of channel portion 108. The spring biases lever 142 in a counterclockwise direction, as viewed in FIGURE 3, to bias nut member 136 inwardly within the guide passage 134 whereby the threaded face of the nut member is positioned partially across the bore 132 of the guide blocks when the lead screw member 60 is not received therein. Another shaft 148 is staked to the opposite walls of channel portion 108 above the shaft 140 and rotatably mounts a bell crank lever 150 located thereon by bushing 151. One leg of the bell crank lever is offset at 152 to slidably engage the upper end of lever 142 and the other leg of the bell crank is pivotally secured to one end of a shiftable rod 154 which extends upwardly therefrom. The engagement of offset 152 with the base wall of channel portion 108 locates nut member 136 within bore 132 when the lead screw member 60 is not received therein.

Figure 2:
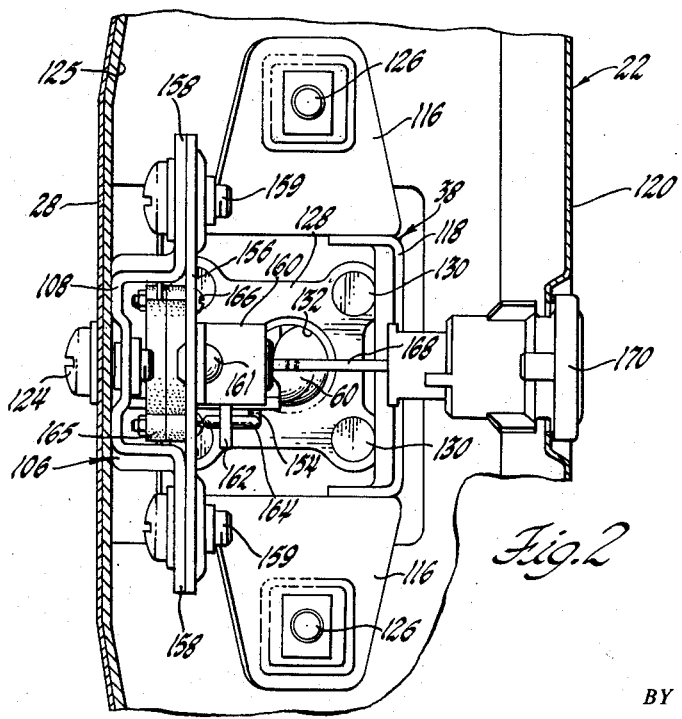
FIGURE 2 is an enlarged view taken generally along the plane indicated by line 2—2 of FIGURE 3.

As best seen in FIGURES 2 and 5 of the drawings, a plate 156 extends between flanges 158 of channel portion 108 and is bolted thereto at 159. A generally U-shaped bracket 160 is riveted at 161 to plate 156 and is provided with an aperture which is aligned with an aperture in the plate 156 as shown in FIGURE 3. A sector member 162 is rotatably mounted in the apertures of plate 156 and bracket 160 and is provided with a circular closed slot 163 having its center at the axis of rotation of the sector member and slidably receiving the hooked end 164 of rod 154. The sector member is operatively secured to a normally open rotary type switch 165 which fits within the space between the plate 156 and channel portion 108 and is bolted to plate 156 at 166. The sector member is further provided with a rectangularly-shaped slot, FIGURE 5, which receives one end of a complementary shaped latch actuating member 168, the other end of which is operatively secured to a lock cylinder assembly 170 of known type which is secured to the outer panel 120 of deck lid 22.

When a suitable key is inserted within the lock cylinder assembly 170 and member 168 is rotated clockwise, as viewed in FIGURE 5, through a limited number of degrees to rotate sector member 162 in the same direction, switch 165 will be closed while slot 163 of the sector member will move relative to the hooked end 164 of rod 154 without in any manner shifting this rod. However, if member 168 is turned further clockwise, the lower end of slot 163 will engage the hooked end 164 of member 154 so as to shift this member upwardly, swing bell crank 150 counterclockwise as viewed in FIGURE 3, and thereby shift lever 142 clockwise so as to move nut member 136 outwardly of guide passage 134 and out of engagement with the lead screw member 60 to unlatch deck lid 22 from the body.

Referring now particularly to FIGURES 7 through 10 of the drawings, the actuator 30 will be described. A generally U-shaped bracket 172 welded to hinge arm 24 is pivoted at 174 to the upper end of a generally square shaped tube 176 provided with a longitudinal slot 178 in one of the walls thereof. A generally square shaped guide bushing 180 is slidably received within tube 176 and is rotatably secured to the upper end of a lead screw 182 whereby the bushing 180 is held against rotation and provides a support guide for the tube 176 when the tube is moved axially relative to the lead screw as will be further described. A nut assembly 184 of generally square shape is received within the lower end of the tube 176 and is bolted thereto at 186. This nut assembly is disclosed and claimed in Patent 2,844,969 Lohr, and reference may be had to the patent for a full and complete description of the details of the nut and the operation thereof. Briefly, however, the nut assembly is of the free wheeling type and includes a solenoid actuated plunger which, when energized, acts to brake the nut relative to the lead screw 182 whereby rotation of the lead screw will cause the nut to move axially thereof and thereby shift the tube 176 axially relative to the lead screw.

The lower end of the lead screw 182 includes a shaft portion 188 which is journalled in a bushing 190 mounted within an upper housing 192, of a reduction gear unit 193, with washers 194 being provided between the threaded portion of the lead screw and the housing 192. Shaft portion 188 includes a generally D-shaped portion 195 which receives a complementary shaped opening in a worm wheel 196, with the worm wheel being secured in place by a nut 198 threaded on a threaded portion 200 of the lead screw. Shaft portion 188 further includes a terminal portion 202 of reduced diameter which is journalled in a bushing 204 mounted within a lower housing 206 of unit 193 bolted at 207 to the upper housing 192. The worm wheel 196 meshes with a worm 208 received within a boss 210 of housing 192, with one end thereof being rotatably supported by a ball bearing 212 and the other end thereof being journalled in a bushing 214. It might also be noted that worm 96 is mounted within boss 97 in the same manner as worm 208 is mounted within boss 210.

Housing 206 includes an apertured lug 218 pivoted at 220 between the ears of a generally U-shaped bracket 222 bolted at 224 to the floor 32 of the deck compartment to thereby pivotally secure the actuator 30 to the body.

As best shown in FIGURES 7 and 8 of the drawings, a normally closed up limit switch 226 is bolted at 227 to an ear lanced out of tube 176, with this switch being opened by the guide bushing 180 when the tube 176 moves upwardly relative to the guide bushing 180 and lead screw 182 to move deck lid 22 to open position. An offset bracket 228 bolted to the tube 176 by one of the bolts 186 supports a cut-off switch 229, the plunger of which engages the lower housing 206 of gear reduction unit 193 when the deck lid 22 is in a fully closed or slightly open position so as to operate this switch as will be further described.

As best shown in FIGURE 1 of the drawings, a reversible double ended shunt wound motor 230 is suitably mounted within the deck compartment of the body and drives a pair of like flexible cables 231, one of which operates the lead screw 182 of actuator 30 and the other of which operates the lead screw member 60 of latch 36. Each of the cable assemblies includes an outer plastic tube 232, FIGURES 4 and 10, which sheaths the cables 234. The free end 235 of each of the cables is of square shaped construction and is received within a generally complementary shaped opening in the worms 208 and 96 whereby operation of the motor 230 will simultaneously drive each of the worms and the lead screw member 60 of the latch assemblies 36 and the lead screw 183 of the actuator 30 across the gear reduction units 61 and 193 respectively. Each of the tubes 232 includes an end cap 236 which receives one end of the bosses 97 and 210 respectively to protect the cables 234.

Figure 15:
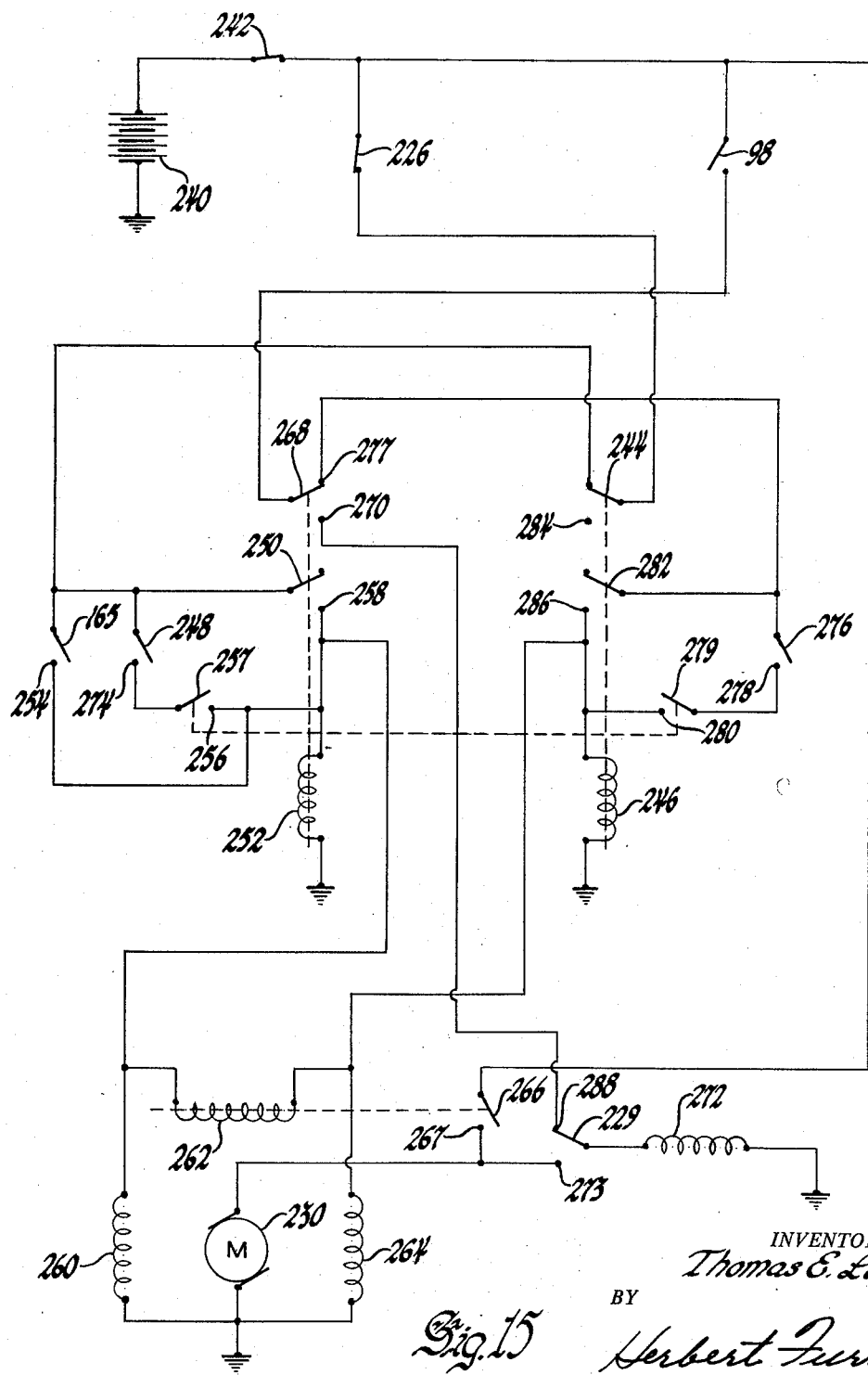
FIGURE 15 is a circuit diagram.

Referring now particularly to FIGURE 15 of the drawings the operation of the latch and actuator will be described. FIGURE 15 shows the circuit when the deck lid is in a closed and latched position.

Assume first that the operator desires to move the deck lid 22 to a fully open position from the exterior of the body. The suitable key is inserted within the lock cylinder assembly 170 to rotate member 168 and close switch 165. As shown in FIGURE 15, the switches 226 and 98 are connected in parallel with the battery 240 across a normally closed master switch 242 which may be conveniently mounted in the glove compartment of the body and which controls electrical operation of the actuator and latch. Switch 226 is normally closed when the deck lid 22 is in a closed latched position and is connected in series with switch 165 across one of the armatures 244 of a control relay 246. Switch 165 is connected in series to the normally open manual "up" control switch 248, which may be conveniently mounted within the glove compartment, and to one of the armatures 250 of a control relay 252. The contact 254 of switch 165 is connected in series with a contact 256 of an ignition controlled switch 257. Contact 256 is connected to ground across the coil of relay 252 and across contact 258 thereof and the upward field winding 260 of motor 230. The coil of the armature control relay 262 is connected across the upward field winding 260 and the downward field winding 264 of the motor, and the armature 266 of the relay is connected between the battery 240 and ground across relay contact 267 and the armature of motor 230.

It can be seen that momentary closure of switch 165 to the contact 254 thereof completes a circuit to ground across the coil of relay 242 so as to move the armature 250 thereof into engagement with contact 258 and to also move the armature 268 thereof into engagement with the contact 270. Closure of armature 250 to contact 258 completes a back feed circuit across the coil of relay 242, also completes a circuit to ground across the upward field winding 260 of motor 230, and further energizes relay 252 by way of the downward field winding 264 to close the relay armature 266 to contact 267 to energize the armature of the motor. Thus motor 230 will be energized to rotate lead screws 96 and 182. Since armature 268 is in series with the switch 98, which is open when the deck lid is in a closed latched position, no circuit is initially completed from the battery to ground across switch 229 and the coil of solenoid 272 of the nut assembly 184 whereby the nut assembly free wheels relative to lead screw 182.

Thus, initially the lead screw member 60 will be rotated so as to thread out of engagement with the nut member 136 to thereby unlatch the deck lid 22 from the body. At about the time that the deck lid is unlatched from the body, the seal pressure is released to allow spring 72 to shift the lead screw member 60 and gear reduction unit 61 slightly downwardly to close switch 98 and thereby energize the solenoid 262 of nut assembly 184 whereby the nut assembly 184 is braked relative to lead screw 182 to move tube 176 axially upwardly relative to the lead screw 182 and thereby move the deck lid toward open position. As tube 176 moves initially axially upwardly relative to the lead screw 182, the plunger of switch 229 will move out of engagement with the lower housing 206 of reduction unit 193 so that the switch will become closed to the contact 273 thereof whereby the coil of solenoid 272 will continue to be energized from the contact 267. When the deck lid reaches a fully open position, switch 226 will be engaged by the guide bushing 180 to open this switch and thereby deenergize solenoid 252 to stop motor 230 and also deenergize solenoid 262.

If it is desired thereafter to close the deck lid from the exterior of the body, this must be done manually since no manner of automatically closing the deck lid from the exterior of the body is provided. Thus, the operator must grasp deck lid 22 and move the deck lid from its open to its closed position, with this movement being allowed since nut assembly 184 is of the free wheeling type and will therefore thread downwardly along the lead screw 178 with very little effort being required. When the deck lid is moved to a fully closed position, the insertion of the lead screw member 60 within the bore 132 of blocks 128 will cam the nut member 136 outwardly of the guide passage 134 to allow the lead screw member to be received within the bore 132, with this movement of the nut member being permitted by the bell crank 142 and 150 and the pivotal and slidable connection between the hooked end 164 of rod 154 and sector member 162.

Assume now that the operator within the vehicle desires to open the deck lid 22 and that the deck lid is in a closed latched position. Momentary closure of switch 248 to the contact 274 thereof will complete a circuit to ground across the coil of relay 252 if the ignition switch is in an "on" position so that the ignition controlled switch 257 is closed to the contact 256 thereof. This will energize relay 252 so as to close armatures 250 and 268 thereof to contacts 258 and 270 thereof. Closure of armature 250 to contact 258 will energize the motor 230 as previously described and will also complete the back feed circuit across the relay 252 so that switch 248 need only be momentarily closed. Thereafter the deck lid 22 will be moved to open position as previously described in conjunction with movement of the deck lid to this position from the exterior of the body.

Assume now that the deck lid is in its open position and that the operator within the vehicle desires to move the deck lid to a closed position. The manual "down" control switch 276, which may be conveniently mounted within the glove compartment adjacent the manual up control switch 248, is connected in series with the contact 277 of relay 252 and may be closed to switch contact 278. Closure of switch 276 to contact 278 will complete a circuit to ground across the coil of relay 246 if the ignition switch is in "on" position so that the ignition controlled switch 279 is closed to the contact 280 thereof. Energization of the coil of relay 246 will move the armatures 244 and 282 thereof into engagement with contacts 284 and 286. Closure of armature 244 to contact 284 results in an open circuit. Closure of armature 282 to contact 286 completes a back feed circuit across the coil of relay 246 so that switch 276 need only be momentarily closed, energizes the downward field winding 264 of motor 230, and completes a circuit to ground across the coil of relay 262 the upward field winding 260 of the motor to close the armature 266 thereof to contact 267 so as to complete the circuit to ground across the armature of the motor. Since switch 229 is closed to contact 273 thereof when the deck lid is in an open position, the solenoid 272 of the nut assembly 184 will be energized so as to brake the nut of this assembly whereby rotation of the lead screw 182 will move the tube 176 axially downwardly relative to the lead screw to move the deck lid toward closed position.

When the deck lid is in a substantially closed position, approximately at the time at which the lead screw member 60 starts to move into threaded engagement with nut member 136, switch 229 will be closed to the contact 288 thereof by engagement with housing 206 so as to deenergize the solenoid 272 of nut assembly 184 whereby this nut assembly free wheels. However, the lead screw member 60 continues to rotate and will thread within the nut assembly 130 to move the deck lid from a substantially closed to a fully closed position. When the deck lid reaches its fully closed position, the seal pressure will cause the lead screw member 60 and the gear reduction unit 61 to be shifted slightly upwardly so as to open switch 98 and thereby deenergize relay 246 and motor 230.

The ignition controlled switches 257 and 279 are ganged so that both are closed to their respective contacts 256 and 280 whenever the ignition switch of the vehicle is in an "on" position and are open to their contacts when the ignition switch is in an "off" position. This feature is provided to prevent opening movement of the deck lid by the manual "up" control switch by an unauthorized person if the driver or operator does not lock the glove compartment of the vehicle.

If the master switch 232 is opened or if there is failure in the electrical control circuit, the deck lid 22 may still be manually moved between open and closed positions. Insertion of a suitable key within the lock cylinder assembly 170 to rotate member 168 will allow the sector member 162 to be rotated so as to shift rod 154 upwardly and thereby swing the bell cranks 142 and 150 to withdraw the nut member 136 outwardly of guide passage 134 and allow deck lid 22 to be opened. The nut assembly 184 will free wheel to permit opening movement of the deck lid and the deck lid may be manually closed, as previously described.

FIGURES 11 through 14 show a modified latch which is basically the same as that previously described except for slight differences and accordingly like numerals have been used for like parts. In the modified latch the gear reduction unit 61 is bolted at 66 to a generally U-shaped support bracket 300 which is welded or otherwise secured to the floor 32 of the deck compartment. Additionally, there is no plate 68 between the upper and lower housings 62 and 64, respectively, of this unit to support any switch since this is not required. A cover plate 301 conceals the assembly 36. The blocks 128 are riveted at 302 to the base wall of a channel bracket 304 which overlies a portion of the inner wall 28 of the deck compartment and an opening 306 in the lower wall 122 of the compartment. Bracket 304 is provided with a plurality of lateral flanges 308 bolted at 310 to the reinforcing member 125 and wall 28, and a pair of lateral flanges 312 bolted to wall 122 and reinforcing member 125 to either side of the opening 306. The rivets 302 support a bracket 314 having an angular bent arm 316 overlying the bore 132 and a pair of apertured bent arms 318. The bent arm 316 of bracket 314 supports a switch 320 which is closed by engagement with the lead screw member 60 when the deck lid is in a closed latched position. Switch 320 performs the same function as switch 98 except that switch 256 is not actuated or controlled by the seal pressure between the deck lid and the body but rather is coordinated to the closed position of the deck lid with respect to the body regardless of whether the seal pressure is at a maximum or a minimum.

Figures 13, 14:
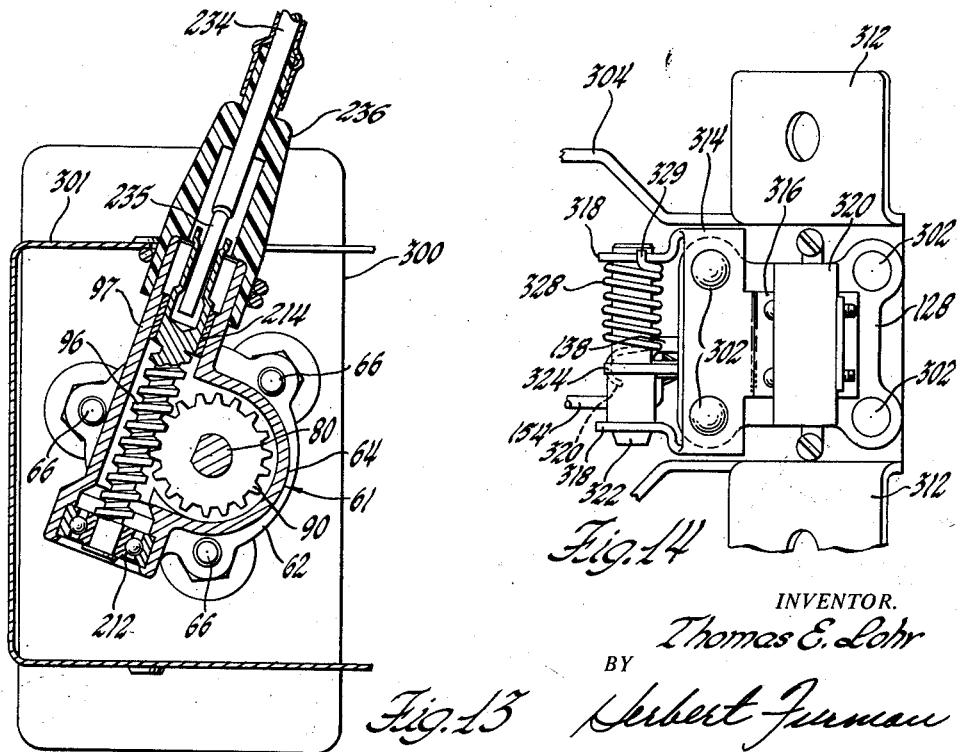
FIGURE 13 is an enlarged sectional view taken generally along the plane indicated by line 13—13 of FIGURE 11.
FIGURE 14 is a view taken generally along the plane indicated by line 14—14 of FIGURE 11.

The arms 318 of bracket 314 support a shouldered shaft 322 which rotatably supports one end of a lever 324. Lever 324 includes a central closed slot 326 which receives a hooked end of pin 138 secured to the nut member 136. A coil torsion spring 328 surrounds the shaft 322, with one end 329 thereof being hooked over one of the arms 318 as shown in FIGURE 14 and the other end 330 thereof being hooked over lever 324 to bias the nut member 136 inwardly of the guide passage 134 into engagement with the lead screw member. The other end of lever 324 is pivotally connected to one end of the shiftable rod 154.

The sector member 162 is rotatably supported between a U-shaped bracket 332 bolted at 334 to plate 336 and the plate 336 itself. Plate 336 is bolted at 338 to switch 165 and the switch in turn is bolted at 340 to bracket 304 and a plate 342 coextensive with plate 336.

The cable 234 is connected to the worm 96 in the same manner as it is connected to worm 208 and further worm 96 is supported within boss 97 in the same manner as worm 208 is supported within boss 210. Accordingly, like numerals have been used in FIGURE 13 as in FIGURE 10.

It is believed that the operation of the modified latch can be easily understood without further description other than to note that switch 320 now provides the down limit switch rather than switch 98.

Thus this invention provides a new and improved vehicle closure actuator and latch arrangement.

What is claimed is:

1. In a vehicle body having a closure swingably mounted thereon for movement between open and closed positions, the combination comprising, extensible and retractable latch means including a lead screw member and a nut member movable therealong into and out of engagement therewith for latching and unlatching said closure with respect to said body and for moving said closure between closed and partially open positions, extensible and retractable operating means including a second lead screw member and a selectively free wheeling nut member movable therealong for interconnecting said closure and said body to move said closure between partially open and fully open positions, and control means operatively interconnecting said latch means and said operating means for causing said nut member of said operating means to free wheel upon movement of said closure from fully open to partially open positions and upon threaded engagement of said nut member and lead screw member of said latch means.

2. In a vehicle body having a closure swingably mounted thereon for movement between open and closed positions, the combination comprising, latch means including a first power operated lead screw mounted on said body, a first nut member mounted on said closure and threadable along said lead screw into and out of engagement therewith to thereby latch and unlatch said closure with respect to said body and move said closure between closed and partially open positions, operating means including a second power operated lead screw mounted on said body, a selectively free wheeling nut member operatively connected to said closure and movable along said second lead screw to thereby operatively interconnect said closure and said body and move said closure between partially open and fully open positions, a power source for said first and second lead screws, and control means operatively interconnecting said power source with said operating means and latch means to provide for sequential operation thereof.

References Cited in the file of this patent

UNITED STATES PATENTS

| 1,505,205 | Kilgour | Aug. 19, 1924 |
| 2,741,503 | Thompson | Apr. 10, 1956 |
| 2,832,620 | Orlow | Apr. 29, 1958 |
| 2,833,536 | Joachim et al. | May 6, 1958 |

FOREIGN PATENTS

| 72,788 | Norway | Nov. 3, 1947 |
| 628,316 | Great Britain | Aug. 26, 1949 |
| 646,241 | Great Britain | Nov. 15, 1950 |
| 688,417 | Great Britain | Mar. 4, 1953 |